United States Patent Office 3,455,895
Patented July 15, 1969

3,455,895
TRIAZINE DERIVATIVES OF SPENT SULFITE LIQUOR
Jaakko E. Niilo-Rama, Wisconsin Rapids, and Robert J. Smiley, Stevens Point, Wis., assignors to Consolidated Papers, Inc., Wisconsin Rapids, Wis., a corporation of Wisconsin
No Drawing. Filed Oct. 10, 1966, Ser. No. 585,238
Int. Cl. C07g *1/00;* C07d *55/20;* A61k *27/00*
U.S. Cl. 260—124                        22 Claims This invention relates to the treatment of spent sulfite liquors, recovery of components thereof, and to the production of novel lignosulfonic acid derivatives.

More specifically, the present invention relates to the treatment of spent sulfite liquors, such as spent calcium, sodium, magnesium and ammonium, spent sulfite liquors with certain aromatic diamino compounds whereby to recover lignosulfonic acid derivatives as a precipitate and to recover carbohydrates and the base from the filtrate.

The invention further relates to the recovery of said lignosulfonic derivatives as novel products and to their use as binders, fire resistant impregnants, and fungicides.

The aromatic diamino compounds employed in the present invention and sometimes for convenience herein referred to as DAT, comprise compounds of the following structural formula:

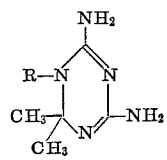

and its acid addition salts and diazotized salts, where R is of the group aryl radical and its derivatives. Examples of such compounds are shown in U.S. Patent No. 3,155,-486.

The aromatical radical, R, can be identified broadly as aryl radical including phenyl, napthyl, biphenyl, or other similar radicals with condensed or noncondensed ring systems. R can be alternatively mono or poly or mixed halogen, nitro, methoxy, hydroxy and alkyl derivative of R. Thus R can contain for instance two halogen atoms, one halogen and methoxy, one methyl, one nitro, and one hydroxy, one halogen and one or two alkyl or generally different substituents in various combinations.

Examples of DAT derivatives with R being a phenyl or substituted phenyl, in the compound 4,6-diamino-2,2'-dimethyl-1-[R]-1,2-dihydro-S-triazine are as follows:

o-Chlorophenyl          3,5-dichlorophenyl
m-Chlorophenyl          2,3:4-trichlorophenyl
p-Chlorophenyl          2,4:5-trichlorophenyl
m-Bromophenyl           3,4:5-trichlorophenyl
p-Bromophenyl           3,4-dibromophenyl
p-Fluorophenyl          4-bromo-3-chlorophenyl
p-Nitrophenyl           3-bromo-4-chlorophenyl
p-Methoxyphenyl         4-chloro-3-methylphenyl
3,4-dichlorophenyl      3-chloro-4-methylphenyl
2,3-dichlorophenyl      3,4-dichloro-5-methylphenyl
2,4-dichlorophenyl      m-Trifluoromethylphenyl
2,5-dichlorophenyl Examples of DAT derivatives where R is other than phenyl or substituted phenyl in the foregoing compound are as follows:

1-naphthyl              o-Amino-diphenyl
2-naphthyl              3-nitro-4-diphenyl
2-methyl-1-naphthyl     5-nitro-1-naphthyl
1-nitro-2-naphthyl A specific example of the aromatic diamino compounds useful in the practice of the present invention is 4,6-diamino - 2 - 2' - dimethyl - 1 - (phenyl) - 1,2 - dihydro-s-triazine hydrochloride having the following structural formula:

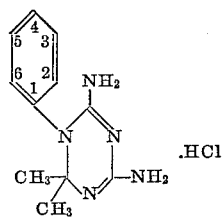

The foregoing compound can be formed by the reaction of analine, acetone, dicyandiamide and hydrochloric acid in alcohol.

In the foregoing, the HCl can be replaced by almost any acid to form the acid addition salt with analine or in general with arylamines to form the corresponding DAT salts, the following salts being suitable: $H_2CO_3$, acetic, propionic, hexanoic, deconoic, aldonic, nitric, $H_2SO_3$ (or $SO_2$ gas), $H_2SO_4$, HI, HBr, $H_3PO_4$.

Thus, for example, the sulfite salt is obtained by employing sulfurous acid as the acid; the carbonate is obtained by employing carbonic acid as the acid and the phosphate is obtained by employing phosphoric acid as the acid, etc.

For preparation of various salts by alternate ways also reference is made to U.S. Patent 3,155,486, columns 6 and 7.

Generally a diazotized derivative can be represented as follows:

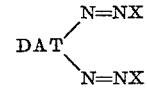

where X is a negative group such as Cl, I, Br, $HSO_3$, etc. as above. The diazotized derivative can be classified as a diazotized salt, and is made by a subsequent reaction from one of the common salts mentioned above, examples being as follows:

4,6-diamino-2,2'-dimethyl-1-(phenyl)-1,2-dihydro-s-triazine diazo salt.
4,6-diamino-2,2'-dimethyl-1-(2,5-dichlorophenyl)-1,2-dihydro-s-triazine diazo salt.
4,6-diamino-2,2'-dimethyl-1-(p-nitrophenyl)-1,2-dihydro-s-triazine diazo salt.
4,6-diamino-2,2'-dimethyl-1-(p-methoxyphenyl)-1,2-dihydro-s-triazine diazo salt.

DAT as a free base is prepared by alkalizing a common DAT salt preferably in an alcohol solution, followed by a filtration of the precipitated free base. Because an additional step is required to make free base for a precipitation, this approach may not be preferred.

The alcohol used acts only as a solvent, therefore another similar solvent can be used, for instance, higher alcohols, but for economical reasons methyl alcohol may be preferred.

The following are examples for preparation of the DAT precipitant:

EXAMPLE I

The DAT precipitant was prepared by reacting aniline, hydrochloric acid, dicyandiamide and acetone in ethyl alcohol. The ratios of the reagents used were 1:1.1:1:1.17:1.46 respectively. The reaction mixture was refluxed 16 hours. After a completion of the reaction, the mixture was cooled and the crystals formed separated by filtration. The yields of DAT were approximately 72-

78% on the basis of the amount of aniline applied. The supernatant solution can be circulated back to a preparation of a new batch of DAT. No pressurized equipment was required to carry out this reaction.

EXAMPLE II

DAT was also prepared as a sulfite or bisulfite salt. By substituting methyl alcohol for ethyl alcohol, the reaction gave the same results. Therefore, the former is preferred due to economical reasons. With regard to the operations in a sulfite mill where $SO_2$ is obtainable without difficulty, for instance, as gas reliefs, the sulfite salt may be preferred, particularly if the recovery of the base used in sulfite acid making is desired, such as in the case of the magnesium and sodium base.

The following is an example for perparing a DAT precipitate of a spent sulfite liquor:

EXAMPLE III

Calcium base spent sulfite liquor to be processed was mixed at a 10 to 50% concentration and at approximately 80° to 150° C. with crystalline or powdered DAT of Example I. The amount of DAT can be varied, but an application of 25% of the dry weight of the spent liquor solids was found to be suitable for 20% liquor. The amount of DAT may be reduced with the increasing concentration of the liquor. The reaction seemed to be completed as soon as complete mixing of the reactants was attained.

The concentration of the liquor may be varied. Consequently, proportions of the components in various streams change considerably. For instance, if a high concentration of the liquor is used, the precipitation of the lignosulfonic acid is more complete and also a greater amount of DAT is carried out over to the DAT lignosulfonic acid precipitate.

A more complete precipitation was also achieved if a spent liquor sample was chlorinated before a precipitation step.

As far as the other aspects of the precipitation step are concerned, the following might be pointed out:

While the reaction mixture is kept hot, hardly any precipitation occurs, but by cooling, the precipitation takes place and increases with the decreased temperature. When still in a heat plasticized condition the precipitate can be drawn into hair-like filaments several feet long, but when cooled to around room temperature the precipitate becomes brittle and can be filtered, centrifuged or decanted from the supernatant solution.

In view of the fact that the moist precipitate melts very easily by heating to 70° to 90° C. the settling and subsequent melt recovery by pumping or draining is advantageous.

In some instances the calcium present in the liquor, approximately 6.0% on solids, have been precipitated by $H_2SO_4$ and removed prior to the application of DAT.

The portion of LSA (lignosulfonic acid) precipitated with DAT can be used as a raw material in resin making and as a component in printing ink formulations. Our trials with a resin made up by reacting a LSA-DAT precipitate with phenol and formaldehyde as in the following example have resulted in paper laminates passing a one hour boiling test, which was employed as a standard screening method. This resin is also of value in printing ink formulation in providing opacity and execllent pigment "hold-out."

EXAMPLE IV

In preparing the resin a precipitate was first refluxed for 3 to 5 hours with a solution of a commercial formaldehyde (37% solution) and methyl alcohol buffered to a pH 7–8 with caustic soda. The amounts were 40 and 45% (dry on dry precipitate) respectively. After the completion of the above step the clear solution was heated with 20% of phenol on the weight of the precipitate at around 70° C. for ½ to 1 hour. Alternatively the amounts of phenol and if necessary formaldehyde can be increased so that no commercial phenolic resin is required.

With regard to the DAT incorporated to the resin it is felt that it contributes to the good properties of the resin being a building block in a 3-dimensional molecular structure of the cured product.

Another valuable by-product has been prepared from a LSA-DAT precipitate by a chlorination followed by a complexing of the resultant derivatives with certain metal ions. Here again DAT contributes to the properties of the final products by possessing a high chelating or complexing power. As demonstrated by the tests the materials prepared were highly fungi-preventing.

An extension of a fungicide making process is a simultaneous preparation of fire retardants. A large batch of LSA-DAT precipitate is halogenated (chlorination might be preferred due to the cost) and the resultant derivative proportioned between fungicide and fire retardant manufacturing.

The use of a chlorinated LSA-DAT precipitate as a raw material for a preparation of fire retardants is based on the fact that chlorinated organic compounds in general, and in a combination with organic nitrogen compounds are applied for fire proofing purposes.

An advantage of using a LSA-DAT halogenated derivative for an impregnation of wood or board is that it is not highy acidic and therefore the strength of the cellulosic material is not weakened by an acidic attack as in the case of straight bromination.

The relative molecular weight determinations have shown that the average molecular weight of the precipitated lignosulfonic acids varies from 13,000 to 16,000 and of those in the filtrate from 2,000 to 3,000. Also the acidity of the low molecular fraction is very low. Because of this distinct difference, the two fractions may be called lignosulfonic acids I and lignosulfonic acids II, respectively. Thus the precipitation can serve as a means to fractionate lignosulfonic acids according to the molecular weight of LSA and to the amount of DAT applied. By a gradual increase of the amount of DAT in a spent sulfite liquor, lignosulfonic acids present can be separated into fractions according to their molecular weight. An obvious advantage of this fractionation method is that the various fractions are in a solid form.

To obtain a pure carbohydrate fraction from the filtrate of the present process, two ion exchange steps can be employed as follows:

EXAMPLE V

DAT, used as a precipitant (and other cations) was recovered from the filtrate by passing it through a cation exchange resin (such as Dowex 50X8). Carbohydrates and the small portion of lignosulfonic acids remained in the filtrate went through the column, but DAT retained in the resin bed. It was removed by an acid regeneration of the resin and circulated back to the precipitation or DAT preparation step.

The lignosulfonic acids in the sugar-LSA solution from the cation column were removed by an anion exchange step, for instance, by employing a weakly basic anion resin (such as A–364C). Also other acidic components possibly being present in the solution were removed by this resin. Here again the carbohydrate fraction passed through the column and was collected as very pure sugar solution for further use. The lignosulfonic acid fraction remaining in the column was recovered by a caustic soda regeneration of the resin bed. It could have been used, for instance, in making of a LSA-DAT resin. By the above sequence almost pure sugar solution for all practical purposes was prepared with approximately 98% yield based on the content of the carbohydrates in the filtrate.

There is no need to always perform the ion exchange steps described above to obtain a fairly pure carbohydrate solution. It was found, for instance, that after drying of the filtrate, most of the DAT was recovered from the dry powder as fairly pure crystals by leaching easily soluble carbohydrates with a small amount of water. Obviously the DAT can be reused for precipitation purposes and a final refining touch given to sugars as described above if completely purified sugars were desired.

Obviously there are many alternatives to choose for further processing of the filtrate or separated sugars. In the following a few of the proposed reactions are listed and discussed briefly:

Perhaps one of the simplest means for a preparation of valuable by-products from a filtrate, as well as from partially or totally purified carbohydrates, is the cyanohydrine reaction, where the five sugars, mannose, glucose, galactose, xylose, and arabinose are reacted with sodium cyanide or hydrogen cyanide (approximately 28–30% on the weight of the sugars as NaCN), for 3–4 hours at 90° to 100° C. The reaction is completed by purging the mixture with air, carbon dioxide, etc., for 1–2 hours by maintaining the above temperature. In the conditions prevailing during the reaction a large portion of the DAT and lignosulfonates are precipitated from the solution. Thus relatively pure aldonates are obtained. If $CO_2$ was used in purging, Ca was separated as carbonate.

The cyanohydrine reaction is commonly carried out with an alkaline catalyst as described, despite the fact that in the prevailing conditions the cyanide polymerizes into dark compounds of incompletely clarified chemical composition. Another undesirable reaction which is also promoted by the alkaline catalyst is a condensation of the aldehyde, in this case sugar aldehyde, leading to aldol products.

The use of buffer solutions giving an optimum pH between 2.2 and 8.0 has been suggested to prevent undesirable concurrent side reactions.

Improved reaction conditions, products and simultaneous recovery of sodium, DAT and cooking base, if still present, can be achieved by conducting the reaction in a cation exchange column. Thus a filtrate is introduced to a cation column simultaneously with sodium cyanide solution in required proportions. In the cation resin bed cations are combined by the resin resulting in a formation of hydrogen cyanide in situ and consequently its instant reaction with sugar aldehydes to form cyanohydrines, which are then collected in the effluent, together with a relatively small amount of lignosulfonic acids and can be hydrolized to aldonic acids if desired.

The bases retained in the ion exchange resin are recoverable with an acidic eluant, for instance $H_2SO_3$, and may be separated due to differences in a solubility.

Hydrogenation of sugars would yield sugar alcohols such as mannitol, xylitol, etc., or their mixture. Various sugar alcohols are used in processing foods and in manufacturing of plastics.

A pure sugar mixture or a filtrate as such after spray drying is suitable for the production of polyhydroxy compounds as intermediates for polyurethane making. These can be prepared by an addition of a suitable alkylene oxide, such as propylene oxide, to a reaction mixture catalyzed by an alkali. Polyhydroxy compounds can be prepared so as to have desired properties, such as hydroxyl content, solubility, and viscosity.

The DAT as a diamino compound present in a filtrate is beneficial in subsequent reactions being an active reaction component.

The well-known reaction, where glucose is converted to methyl glucoside by reacting with methyl alcohol in a HCl acidified solution can be applied on the carbohydrate mixture and corresponding methyl derivatives obtained. These materials are highly reactive polyols producing urethane films of great stability.

Polyester and polyamide derivatives can be included in the above class. However, they would not serve as intermediates alone but also as final products. For instance, if a mixture of polyhydroxy material and the DAT derived, for example from a filtrate, was reacted with a di- or polybasic organic acid, a product containing a polyester and polyamide is obtained.

The following are additional examples for preparation of the DAT precipitant:

EXAMPLE VI

A mixture of 300 ml. of aniline, 280 ml. of concentrated hydrochloric acid, 307 g. of dicyandiamide in 455 ml. of acetone and 570 ml. of ethyl alcohol were stirred in a 3-neck flask provided with a reflux condenser, water bath, and magnetic stirrer, under reflux for 16 hours. In the beginning of the reaction a clear solution was obtained, but later white crystals were formed gradually in the brownish solution. The mixture was cooled in a refrigerator overnight and the colorless crystals filtered. The obtained yield was 54.0% on the basis of the aniline applied.

EXAMPLE VII

A reaction was carried out similarly as in Example VI, except that methyl alcohol was substituted for ethyl alcohol. The yield of first crop of crystals was 56.0%. A concentration of the mother liquor resulted in an additional yield of 20.2% or a total yield of 76.2%.

EXAMPLE VIII

A mixture of 750 ml. of aniline, 697 ml. of concentrated hydrochloric acid, 767 g. of dicyandiamide, in 1140 ml. of acetone, and 1420 ml. of methyl alcohol when reacted and processed as in Example I gave a yield of 51.5%, and after concentration of the supernatant the total yield of 74.0%.

EXAMPLE IX 200 ml. of aniline, and 205 g. of dicyandiamide were mixed in 378 ml. of ethyl alcohol. 61 g. of sulfur dioxide was introduced gradually to the mixture by bubbling through a gas dispersion tube. During the addition the temperature ros to 63° C. Thereafter 303 ml. of acetone was added followed by 100 ml. of water and heating up to the refluxing temperature which was maintained for 12 hours. 49 g. of $SO_2$ was added and the reaction completed by 4 hours additional reflux. The obtained product was a clear, light brown solution with a 55.6% solid content. A crystalline product separated out after extended storing.

EXAMPLE X

A mixture of 141 g. of 2,5-dichloroaniline, 75 ml. of concentrated hydrochloric acid, 81 g. of dicyandiamide, and 120 ml. of acetone in 150 ml. of ethyl alcohol were reacted under refluxing for 16 hours. As a result a dark brown solution with a solid content of 55.0% was obtained.

EXAMPLE XI 25 g. of the crystalline reaction product from Example VI was mixed in 25 ml. of distilled water acidified with 14 ml. of concentrated hydrochloric acid. In a separate flask 7 g. of sodium nitrite was dissolved in 35 ml. of distilled water. These two solutions were reacted by adding the sodium nitrite solution gradually to the DAT slurry while maintaining the temperature in the reaction flask below 10° C. The resultant product was a light yellow crystalline material.

EXAMPLE XII 104 g. of sulfur dioxide was bubbled through a solution of 324 g. of aniline in 600 ml. of ethyl alcohol. Then 324 g. of dicyandiamide was added followed by 156 g. of $SO_2$. After completion of the addition of $SO_2$, 480 ml. of acetone was introduced and the reaction mixture heated up to boiling and maintained under refluxing for one hour; at that stage of the reaction 25 ml. of water was added. The mixture was refluxed further for 15 hours to complete the preparation. A light yellow viscous solution was obtained weighing 1713 g. and having the solids content of 66.9%. The reaction product was divided in two equal portions for crystallization.

The following are examples for precipitation of lignosulfonic acids:

EXAMPLE XIII 150 g. of spray dried Ca-base spent sulfite liquor powder was dissolved in 750 ml. of distilled water. The resultant solution was heated to boiling and 37.5 g. of the crystals prepared as described in Example VII were added. The temperature of the solution was maintained close to boiling for 15 minutes. The solution was cooled in a cold water bath and left to stand in a refrigerator overnight. The resultant precipitate was separated by filtering and washed with a small amount of water. The precipitate was dried and gave a yield of 42.0% on the basis of the spent sulfite liquor solids applied.

The filtrate was analyzed for sugars, precipitant, and lignosulfonic acids by spectrophotometric methods. The amount of sugars as glucose were 28.0%, precipitant 14.0%, and lignosulfonic acids 8.7% on the weight of the spent liquor solids.

One-half of the filtrate was taken and 9.80 g. sodium bicarbonate was added to precipitate the calcium present. By this addition the pH of the filtrate was raised from 3.8 to 6.75. It was increased further to pH 9.15 by a small addition of concentrated ammonium hydroxide. The white precipitate was filtered and weighed giving a yield of 8.22 g. or approximately 11.0% on SSL (spent sulfite liquor) solids.

After the $NaHCO_3$ treatment of the filtrate the determination of sugars, precipitant, and lignosulfonic acids were repeated. The results were 28.0% (as glucose), 13%, and 8.7%, respectively. By a concentration of the filtrate to ⅕ of its volume the amount of the contaminants was reduced further with a loss in the sugar content. The final composition of the filtrate was as follows: sugars 23.4%, precipitant 11.3%, and lignosulfonic acids 4.5% on SSL solids.

EXAMPLE XIV

A precipitation of lignosulfonic acid was carried out as described in Example XIII. The yield also was approximately the same or 42.0% on the liquir solids or on the oven dry weight of the powder applied.

Analysis of the filtrate showed a sugar content as glucose of 27.4%, precipitant 14.0% and lignosulfonic acid 8.3% on the basis of SSL solids. A part of the filtrate was taken and chlorinated by bubbling chlorine through the solution for 15 minutes. This resulted in an orange-yellow precipitate, which was separated by filtering.

A subsequent analysis of the filtrate indicated the following changes in the composition: sugars 25.3% (27.4%), precipitant 6.6%, and lignosulfonic acids 1.4%.

EXAMPLE XV

Lignosulfonic acids in a liquor prepared from a spray dried spent sulfite liquor were precipitated and separated as in Example XIII, except that the concentration of the liquor was 35% and the amount of precipitate applied 15% on the liquor solids. The filtrate obtained was analyzed again for sugars, precipitant, and lignosulfonic acids. The amounts were: 26.0% sugars as glucose, 10.7% precipitant, and 19.3% lignosulfonic acids on the dry solids of the liquor.

The filtrate was chlorinated as in Example XIII until no more precipitate was formed. After the removal of the precipitate the same analysis as indicated above gave the corresponding values 20.0%, 7%, and 2.7%, respectively.

EXAMPLE XVI 150 g. of the same spray dried powder as in other examples was dissolved in distilled water to make a 20% solution. This was chlorinated for 10 minutes by introducing chlorine gas slowly to the solution. No precipitate was formed during this period. The liquor was heated on a steam bath almost to boiling and the precipitant applied in an amount of 25% on the liquor solids. Part of the LSA was precipitated even when the solution was hot. While cooling more hard chunks were formed. These were broken down and a continued chlorination for 15 minutes resulted in a heavy precipitate. This was allowed to stay overnight and settle on the bottom of the beaker. The precipitate was filtered. In the filtrate the content of sugars, precipitant, and lignosulfonic acids were determined yielding 27.7%, 12.9%, and 1.8%, respectively. By neutralizing the filtrate with ammonium bicarbonate to a pH 7.0 an additional precipitate was obtained and a subsequent determination of the constituents indicated 24.0% sugars, 6.4% precipitant, and 1.45% lignosulfonic acids.

EXAMPLE XVII

A solution at 30% concentration was made up by of 150 g. of dry solids as in Example XVI followed by an addition of 51 ml. of 30% sulfuric acid. A resultant white precipitate after filtering, washing, and drying gave 25.20 g. After this pretreatment a precipitation of lignosulfonic acids was carried out similarly as described priorly at 20% concentration by applying 25% precipitant on solid basis. The yield of the precipitate was 40.0%. Analysis of the filtrate made up to 1,000 ml. showed 26.4% sugars, 18.6% precipitant, and 10% lignosulfonic acids on the basis of dry spent sulfite liquor solids.

A 100 ml. sample of the filtrate was taken and chlorinated slightly by bubbling chlorine gas through the solution for 10 minutes. As a result a precipitate was formed. This was separated by filtration and the filtrate analyzed for sugars, DAT, and lignosulfonic acids. The values were 24.0%, 9.2%, and 1.06%, respectively. Thus the amount of DAT was reduced roughly to ½ and lignosulfonic acids to ⅒ of the original filtrate.

Another sample (500 ml.) of the original filtrate without chlorination was passed through an ion exchange column containing 100 g. of Dowex 50WX2 cation resin in $H^+$ form. The solution passing through the column was collected in fractions. The determinations of sugars, lignosulfonic acids, and DAT showed a complete removal of DAT, a sugar content of 22.4% and of lignosulfonic acids practically unchanged.

The total effluent from the cation column was introduced to the top of an anion resin bed containing 140 ml. Diamond Alkali resin A–364C. The collected effluent contained 22.0% sugars and 0.29% lignosulfonic acids when calculated on the solids of the spent sulfite liquor originally taken.

The anion resin bed was regenerated with 1 N caustic soda. The recovery of lignosulfonates was practically 100% or 9.70% on the liquor solids.

A sample of the recovered lignosulfonates was taken together with a sample of the original LSA-DAT precipitate for an average molecular weight determination. The figures obtained were 2314 and 2696 for the fraction collected from the anion column, and 13,241 and 16,112 for the major portion of lignosulfonic acids precipitated with the DAT salt.

EXAMPLE XVIII 12.5 g. of the precipitant was introduced to 100 ml. of a sodium base bisulfite liquor at 50% concentration heated up almost to boiling. The precipitate obtained by cooling was filtered and washed. The yield of the dry material was 45.8%.

The filtrate having a total volume of 100 ml. was analyzed as follows:

| | Percent on liquor solids |
|---|---|
| Sugars (as glucose) | 17.0 |
| Lignosulfonic acids | 12.7 |
| Precipitant | Minimal |
| Sodium (as carbonate) | 18.6 | or a 73% recoverey based on the amount of sodium present in the original liquor.

EXAMPLE XIX 500 g. of the same dried spent liquor as described in Example XIII was dissolved in 1100 ml. of distilled water or at 45.5% concentration and precipitated while heating. The weight of the resultant filtrate was 256 g. or the yield 51.0%.

EXAMPLE XX

A semi-pilot scale trial was conducted by dissolving 10 kg. of spray dried powder in a sufficient amount of water to make a 20% solution in an experimental digester. While heating the liquor, 2.5 kg. precipitant was applied and the temperature maintained close to the boiling point for 20 minutes. The precipitate was separated by filtering from the cold liquor and subsequently heated up to 85° C. in a wet state. 70 g. of concentrated sulfuric acid was added as a 10% solution to the melt under vigorous mixing. Heating was continued for 30 minutes, and the pH of the melt was finally increased with 24% caustic soda from a pH around 2.0 to 4.0. The melt was allowed to cool and the resultant precipitate filtered and washed with a small amount of water. The yield was 42.0% on the basis of the dry solids used.

EXAMPLE XXI

A sample of a digester strength magnesium bisulfite liquor was concentrated in a laboratory flash evaporator to a 38.8% solid content. 50 g. (as solids) of this liquor was heated to boiling and 12.5 g. of precipitant added as sulfite salt. The obtained liquor was heated for 20 minutes and then cooled and placed into a refrigerator. The precipitate was filtered and gave a yield of 22 g. or 44.0% on liquor solids.

The following are examples for preparation of resins from LSA-DAT precipitate:

EXAMPLE XXII

A mixture of 1,000 g. of lignosulfonic acid precipitate obtained as in Example XIII, 1167 ml. of formaldehyde (37% solution), and 465 ml. of methyl alcohol was buffered with 15 g. of sodium hydroxide in 15 ml. water and heated to boiling under a reflux condenser and agitation. The initial pH was above 7.0. Refluxing was continued for five hours by maintaining the pH above 7 by occasional additions of 24% solution of caustic soda, total volume added was 52 ml. giving a pH of 7.5.

The preparation was continued by adding 200 g. of phenol after the mixture was cooled to 70° C. The reaction continued by maintaining the temperature at 70° C. for ½ hour. The yield of the resin was 2850 g. with solids of 48.7%, viscosity 232 c.p.s.

The resultant resin together with a commercial phenolic resin in a 1:1 mixture was used for making paper laminates. After two hours boiling in water the samples showed moisture pickup values averaging from 7 to 10%. Preliminary test to make chipboard by using the lignin based resin alone and plywood with lignin based resin in the various combinations with phenolic resins gave good results when tested (water soaking and boiling tests). The ratios of lignin resin to phenolics were 1:0.2 and 1:1.

EXAMPLE XXIII

A mixture of 500 g. of the precipitate from Example XX, 580 ml. formaldehyde and 230 ml. of methanol was treated as described in Example XXII, and the preparation completed by reacting with 250 g. of phenol. The yield of the resin was 1,600 g. at 47.5% solids and viscosity of 260 c.p.s.

A sample of three ply fir plywood was made by using this resin alone as an adhesive. A test piece passed a four hour boiling-24 hour baking-four hour boiling test.

The following are examples for chemical modification of sugar filtrate:

EXAMPLE XXIV

A batch of a sugar filtrate obtained similarly as in Example XIII after filtering the precipitated lignosulfonic acids was air dried to a solid content of 88.7%. One hundred thirteen (113) g. of powderized filtrate was dissolved in 400 ml. of dimethyl formamide. The mixture was heated up to 110° C. under a stream of nitrogen to drive all of the moisture out, followed by cooling the solution to 30° C. Then 50 ml. of toluene diisocyanate was added gradually to the solution under nitrogen and thorough agitation. The resin-like viscous product was allowed to mix overnight. Total weight of the material including the solvent was 470 g. at a solid content of 35.2 percent. When mixed with water the product could be precipitated as an off-white flocculent precipitate.

A portion of the solvent based product was taken and applied by using a bench-type laboratory coater on a sheet of paper (70# basis weight) having a pigment coating with starch adhesive. The level of application was 0.5–1 pound/ream. An improvement in wet rub and wet pick values was obtained as shown in the following table, especially during aging.

| Aging time, days | 1 | 3 | 7 |
|---|---|---|---|
| Sample A with treatment—drying method: | | | |
| 20 sec. on steam drum: | | | |
| Wet rub [1] | 0 | 1 | 2 |
| Wet pick [2] | 4 | 4 | 4 |
| 30 sec. at 150° C.: | | | |
| Wet rub [1] | 0 | 1 | 3 |
| Wet pick [2] | 4 | 3 | 4 |
| 60 sec. at 150° C.: | | | |
| Wet rub [1] | 1 | 1 | 3 |
| Wet pick [2] | 4 | 3 | 4 |

[1] Maximum wet rub rating=4.
[2] Maximum wet pick rating=5.
NOTE.—Sample B without treatment—tested as above; all of the ratings 0.

We claim:

1. A lignosulfonic acid derivative of an aromatic diamino compound of the group having the following structural formula:

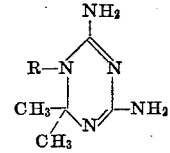

and its acid addition salts and diazotized salts, and where R is phenyl, substituted phenyl, the substituents being halogen, nitro, methoxy, hydroxy and methyl; naphthyl, nitronaphthyl, methylnaphthyl, amino naphthyl, biphenyl, nitrodiphenyl and aminodiphenyl.

2. A method for separating components of spent sulfite liquors which comprises, heating a spent sulfite liquor of the group consisting of calcium, magnesium, ammonium and sodium spent sulfite liquors with an aromatic diamino compound of the group having the following structural formula:

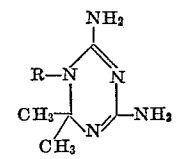

and its acid addition salts and diazotized salts, and where R is phenyl, substituted phenyl, the substitunets being halogen, nitro, methoxy, hydroxy and methyl; naphthyl, nitronaphthyl, methylnaphthyl, amino naphthyl, biphenyl, nitrodiphenyl and aminodiphenyl, cooling the reaction mixture and recovering a lignosulfonic acid derivative of said aromatic diamino compound as a precipitate.

3. The process of claim 2 which comprises recovering carbohydrates from the filtrate.

4. The process of claim 2 which comprises recovering relatively low molecular weight lignosulfonic acid material of molecular weights 2000 to 3000 from the fitrate.

5. The method of claim 2 where the spent sulfite liquor is pre-treated with chlorine.

6. The method of claim 2 wherein the resultant lignosulfonic acid derivative is chlorinated.

7. The method of claim 2 where the aromatic diamino compound has the following structural formula:

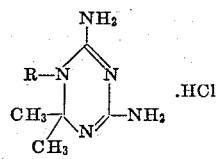

8. The method of claim 2 where R is phenyl.
9. The method of claim 2 where R is naphthyl.
10. The method of claim 2 where R is bisphenyl.
11. The method of claim 2 where the aromatic diamino compound is 4,6-diamino-2,2'-dimethyl-(1-phenyl)-1,2-dihydro-s-triazine bisulfite and has the following structural formula:

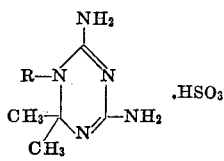

12. The method of claim 1 where R is a halogenated phenyl radical.

13. The method of claim 2 where the aromatic diamino compound is 4,6-diamino-2,2'-dimethyl-1-(phenyl)-1,2-dihydro-s-triazine hydrochloride and has the following formula:

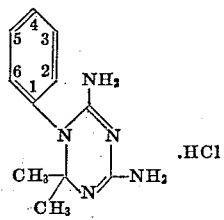

14. The method of claim 2 where the aromatic diamino compound is 4,6-diamino-2,2'-dimethyl-(2,5-dichlorophenyl)-1,2-dihydro-s-triazine hydrochloride and has the following formula:

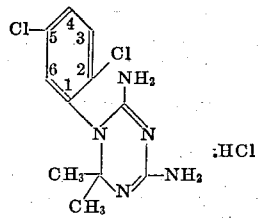

15. The method of claim 2 where the aromatic diamino compound was formed by the reaction of aniline, acetone, dicyandiamide and hydrochloric acid in alcohol.

16. The method of claim 2 wherein the aromatic diamino compound was formed by the reaction of aniline, acetone, dicyandiamide and sulfur dioxide in alcohol.

17. The method of claim 2 where the reaction is carried out at a temperature of from about 80° C. to about 150° C.

18. The process of claim 2 which comprises recovering unreacted aromatic diamino compound from the filtrate by passing the filtrate through a bed of cation exchange resin and removing said diamino compound therefrom by acid regeneration.

19. The process of claim 2 wherein the spent sulfite liquor is calcium base spent liquor and calcium is recovered from the filtrate by treatment with a precipitator selected from the group consisting of carbon dioxide, sodium carbonate, sodium bicarbonate, and ammonium bicarbonate.

20. The process of claim 2 wherein the spent sulfite liquor is magnesium base spent liquor and magnesium is recovered from the filtrate by treatment with a precipitator selected from the group consisting of carbon dioxide, sodium carbonate, sodium bicarbonate, and ammonium bicarbonate.

21. The process of claim 2 which comprises removing relatively low molecular weight lignosulfonic acids from the resulting filtrate by treating it with weakly basic anion resin.

22. The process of claim 21 wherein lignosulfonic acid is removed from the resin by caustic soda regeneration of the resin.

References Cited

UNITED STATES PATENTS 2,850,492   9/1958   Erskine et al. _____ 260—124
3,155,486  11/1964   Stevenson et al. ____ 260—249.9

CHARLES B. PARKER, Primary Examiner

D. R. PHILLIPS, Assistant Examiner

U.S. Cl. X.R.

106—123; 117—137; 260—17.5, 141, 209; 424—78